Oct. 17, 1933.  A. J. FRANTZ  1,931,255
WELDING MACHINE CONTROL
Filed Oct. 13, 1931   4 Sheets-Sheet 4
Fig. 5.
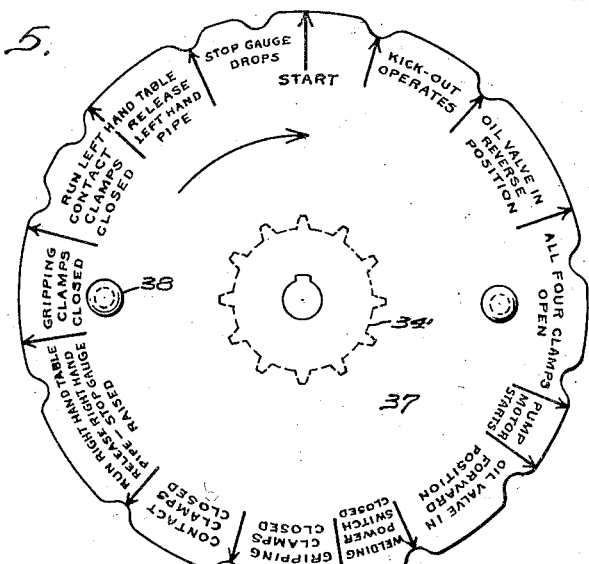
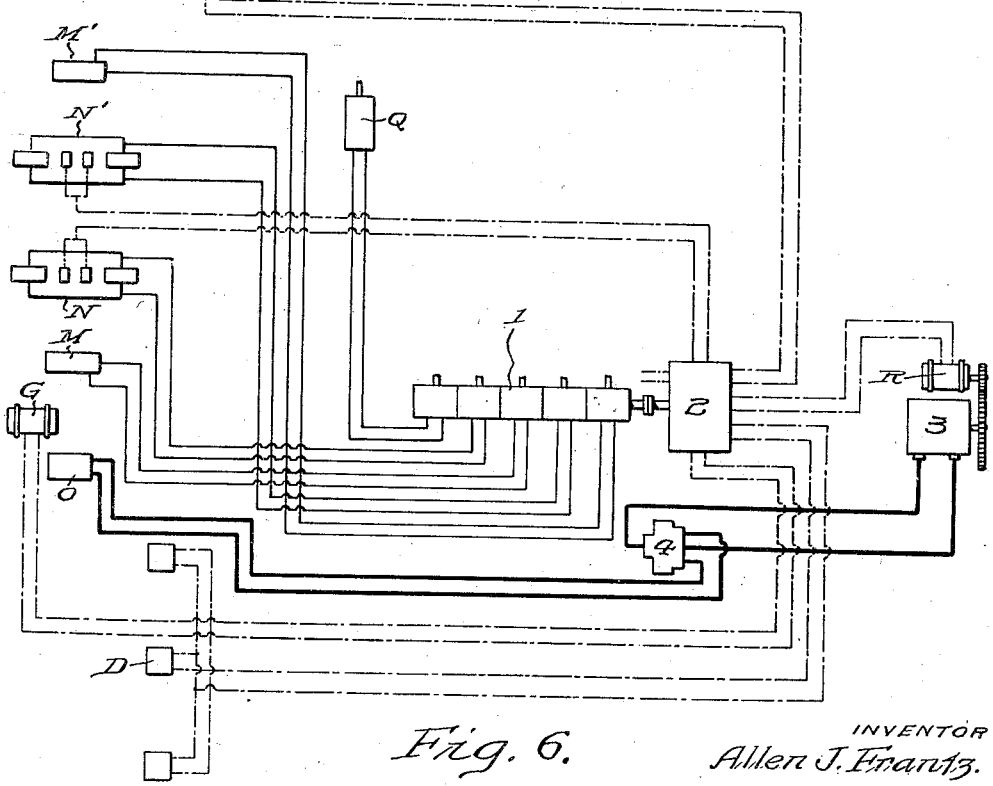
Fig. 6.
WITNESS
F. J. Hartman.
INVENTOR
Allen J. Frantz.
BY
ATTORNEYS Patented Oct. 17, 1933

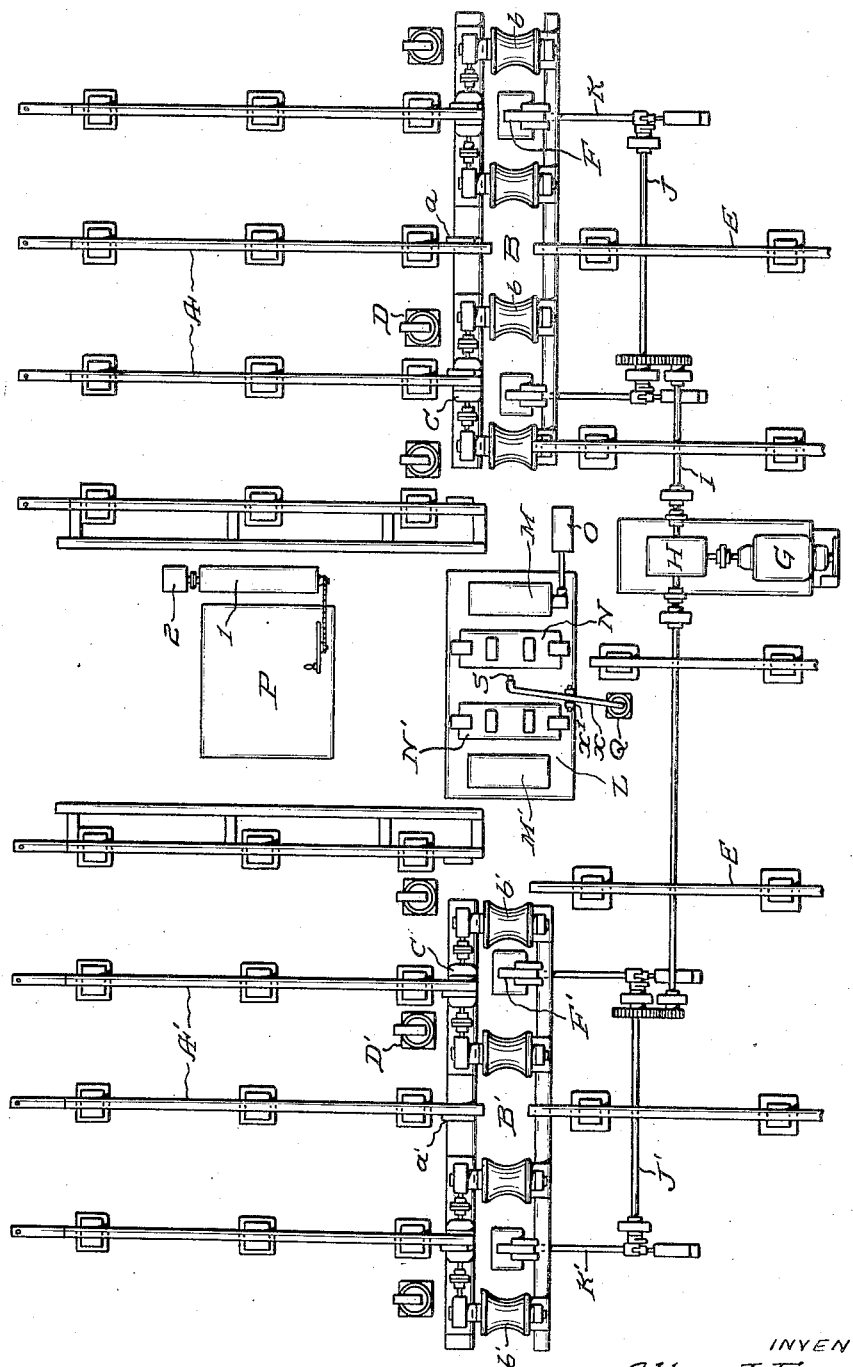

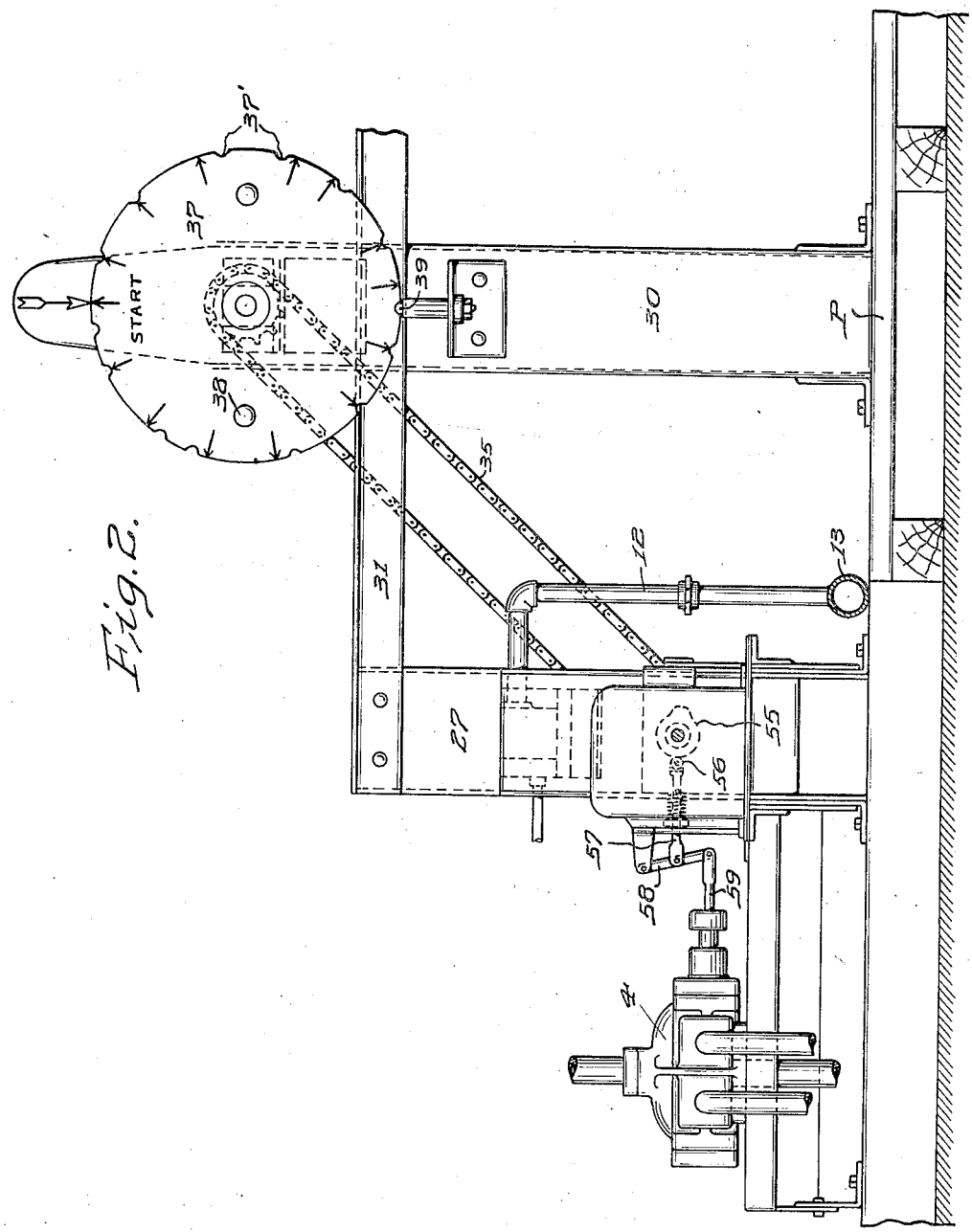

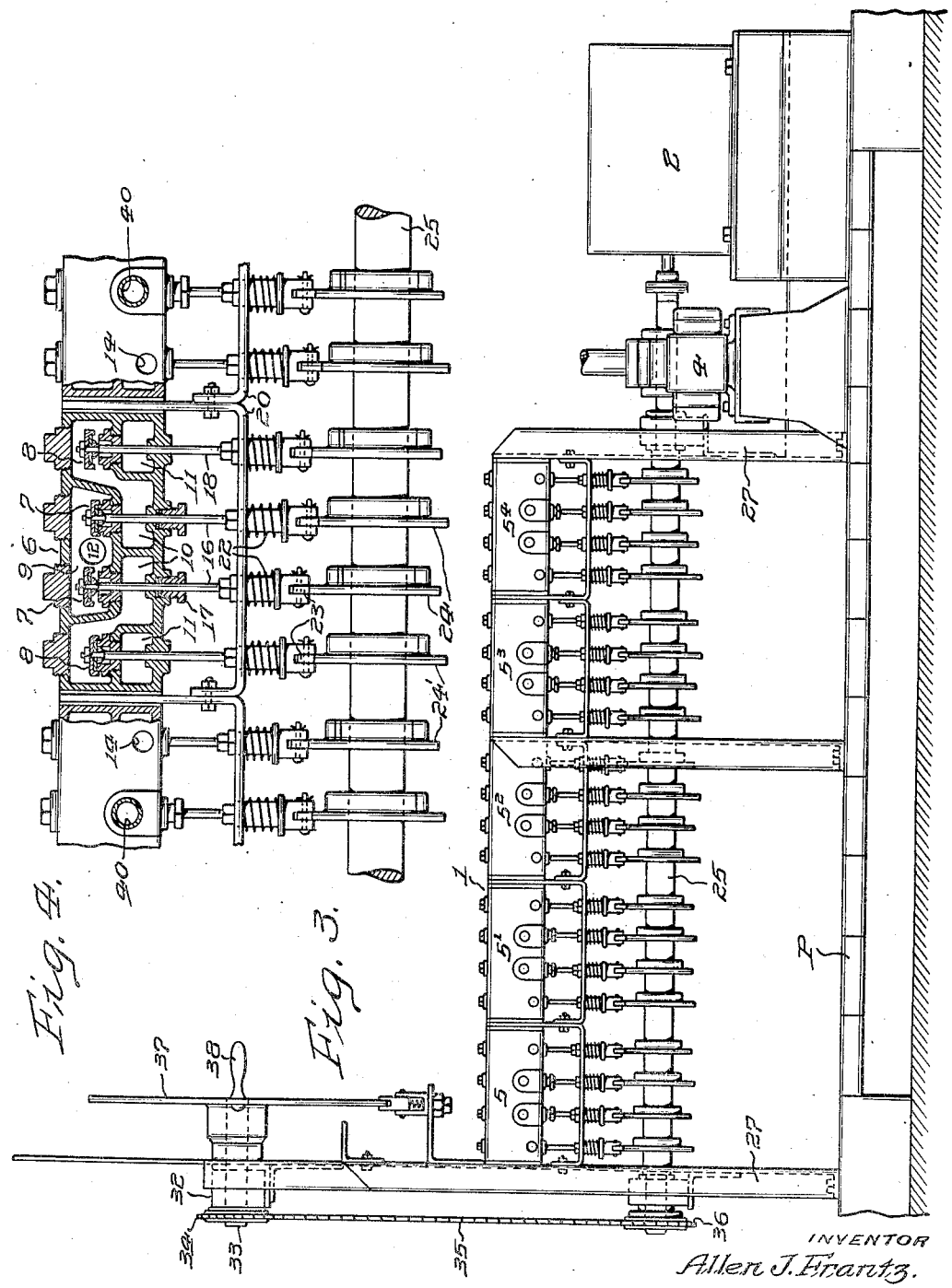

1,931,255

UNITED STATES PATENT OFFICE 1,931,255

WELDING MACHINE CONTROL

Allen J. Frantz, Gary, Ind.

Application October 13, 1931. Serial No. 568,541

4 Claims. (Cl. 219—4)

The present invention relates to the control of butt welding machines and while especially applicable to those intended for welding together sections of pipe, may be readily adapted to the control of machines intended for butt welding sheets, plates, rods and other articles.

Numerous forms of butt welding machines are in commercial use but substantially all of them, when designed for butt welding pipe, operate on generally similar principles and embody a plurality of mechanisms designed to effect the various operations incident to the welding cycle, these mechanisms being under the direct control of the operator of the machine through the medium of a plurality of individual devices such as switches, valves, and the like, centralized at a control station. It thus frequently happens that the operator is required to manipulate from fifteen to twenty control devices during a single welding cycle in such manner that the various steps incident thereto will be carried out in their proper sequence, and as butt welding machines used in welding pipe are capable of making as many as a hundred welds an hour, it is apparent that an operator having to manipulate say seventeen controls for each welding operation is required to make some seventeen hundred sequential movements per hour. While a skilled operative is frequently capable of doing this satisfactorily at the commencement of his working period, the strain imposed upon him is obviously very great with the result that he gradually unconsciously decreases the rapidity of his movements with consequent reduction in the productive capacity of the machine, and, additionally, occasionally fails to operate the controls in proper sequence so that imperfect welds are produced, time and material wasted, and the machine sometimes damaged. Thus the capacity of the machine to turn out the maximum quantity of satisfactory work in a given period is directly governed by the physical and mental condition of the operator which determine his capacity for properly and sequentially operating the various separate controls with the requisite speed and accuracy.

It is therefore an object of the present invention to provide a novel form of control mechanism for a butt welding machine which is of semi-automatic character and so designed as to enable the operator to properly control the machine with maximum rapidity and minimum mental and physical strain.

A further object of the invention is to provide a control of this character which is readily applicable to butt welding machines of the forms now in general use and through the medium of which the operator is enabled to sequentially operate the various elements of the machine in such manner as to insure the production of satisfactory welds under the varying conditions necessarily encountered while consecutively welding together a plurality of pieces of pipe and which frequently require slight changes in the times normally allotted for the different elements to perform their respective functions in the welding cycle.

A still further object of the invention is to provide a control of such character as to guard against lapses of memory or errors on the part of the operator which, with the control mechanisms generally heretofore employed, frequently result in the production of imperfect welds or damage to the welding machine through failure of the operator to properly and sequentially operate the respective controls.

Still further objects of the invention are to provide a control mechanism arranged to enable proper actuation and control of a butt welding machine from a single station desirably located at a point from which the operator can observe the various operations incident to the welding cycle and thus regulate the same as required to produce satisfactory welds; which is so designed as to substantially prevent the operator from either intentionally or inadvertently manipulating the various controls in improper sequence or in such manner as to damage the welding machine; which is of relatively simple character and so designed and constructed as to minimize the danger of its getting out of order or becoming otherwise unserviceable under the conditions of use to which it is necessarily subjected; which enables the welding machine to be operated substantially at the maximum of its productive capacity for long periods of time by a single operative without imposing an undue strain upon him and which embodies other novel features, objects and advantages hereinafter more particularly set forth or which will be apparent to those skilled in the art from the following description of one embodiment of the invention as illustrated in the accompanying drawings in operative association and combination with a butt welding machine of ordinary type adapted for welding pipe of which, however, only such parts are shown, and these in a substantially diagrammatic way, as are requisite for a proper comprehension of the invention.

In the said drawings, Fig. 1 is a diagrammatic top plan view of the welding machine and control mechanism; Fig. 2 is a fragmentary front elevation, considering the machine from the position in which the welder stands, showing the control dial and associated parts on a much larger scale than Fig. 1; Fig. 3 is a side elevation, on substantially the same scale, of the air valve battery, master switch, oil control valve and associated parts; Fig. 4 is a fragmentary view on a still larger scale of a portion of the air valve battery with certain parts broken away into vertical section to better show internal construction; Fig. 5 is a front face view of the control dial removed from its associated parts and showing the indications preferably engraved or otherwise formed thereon. Fig. 6 is a diagrammatic figure indicating the several principal mechanisms or elements of the welding machine which are actuated during the welding cycle as well as the means preferably employed for effecting their actuation; air pipes in this figure being designated by relatively light solid lines, oil or other liquid pipes by relatively heavy solid lines, and electric circuits by dot and dash lines, with a view to clearly differentiating between them. Throughout the drawings like characters of reference are used to indicate the same parts.

It will facilitate a ready understanding of the invention if, at this point, brief reference is made to the construction and operation of the ordinary form of machine utilized for butt welding together two sections of pipe so as to form a double-length section, and such as is shown in the drawings. A machine of this character comprises, speaking generally, the welding unit proper in which the welding operation is performed. Aligned with and on opposite sides of this unit roller tables are arranged, by means of which the pipe sections can be moved longitudinally into proper relation with the unit after disposition on the tables. In front of each roll table and aligned therewith is a series of downwardly inclined skids adjacent the outer ends of which, that is, those ends most remote from the roll tables, the pipe sections are deposited and from which points they roll gradually down towards the roll tables until their progress is arrested by a series of stops adjacent the inner or rear ends of the skids. Beneath each set of skids are disposed lifts operable to raise the leading pipe section sufficiently to permit it to pass over the stops and move onto the adjacent roll table. After one pipe section has reached this position, it is thereafter advanced by its roll table toward the welding unit until it encounters a pipe stop disposed to properly position it with regard thereto; the stop is then withdrawn and the other pipe section, now lying on its roll table, is in turn advanced towards the welding unit until its progress is arrested by engagement with the adjacent end of the first section. The machine is also equipped with contact clamps adapted for engagement with the pipe sections after the latter have been properly positioned with respect to the welding unit and which form the means by which the welding current is carried into them, and with locking or grip clamps for respectively holding the sections in welding position, as well as with means for pressing the ends of the sections together by slightly moving either one or both of them longitudinally after the welding current has been turned on and during the actual welding operation. Means are also provided for ejecting the welded pipe from the machine after the completion of the welding operation comprising mechanism for lifting the pipe from the roll tables onto another series of skids disposed on the rear side of the machine and inclining downwardly therefrom; after being placed on these skids the welded pipe rolls along them to a storage point or to some other machine by which additional operations, with which the present invention is not concerned, are performed upon it.

In the particular machine which I have chosen to illustrate, the means for lifting the pipe sections over the stops to enable them to reach the roll tables are actuated by solenoids, and the rolls of the roll tables are motor driven, as is the mechanism for raising the welded pipe from the roll tables and transferring it to the skids on which it leaves the machine; these several mechanisms are therefore all electrically actuated, and they, as well as the welding current, would thus ordinarily be individually controlled by separate manually operable switches disposed at the control station. On the other hand, the stop which determines the position of the first pipe section with respect to the welding unit is air actuated, as are likewise the contact clamps and the grip or locking clamps for the two pipe sections respectively and would thus ordinarily be individually controlled by separate manually operable valves disposed at said station. The mechanism whereby the pipe sections are forced together during the welding operation by a short relative longitudinal movement, is operated through the medium of a motor-driven oil pump, electrically controlled, and a suitable 4-way reversing valve which, in turn, is mechanically controlled in accordance with the present invention as hereinafter described.

It is thus apparent that during the welding cycle ultimate control of these various mechanisms of the machine is effected through the medium of electricity, of compressed air and of oil, and in accordance with my invention provision is made whereby the operator can conveniently actuate the means directing the flow of these several fluids in properly coordinated and timed sequence with a minimum of effort and maximum rapidity.

Referring now more particularly to Fig. 1 showing, among other things, and in a diagrammatic way, the principal elements of the welding machine to which reference has just been made, it will be noted that the machine comprises the skids A and A' upon which the pipe sections roll toward the roll tables B, B' respectively provided with the rolls b, b' driven from the motors C, C', and beneath the skids A, A' adjacent the roll tables are located mechanisms D, D' for lifting the pipes over the stops a, a' disposed adjacent the ends of the skids. From the opposite sides of the tables extend the skids E upon which the welded pipe leaves the machine; adjacent the inner ends of these skids are arranged the kick-offs F, F' by means of which the welded pipe is raised from the roll tables and thrown over onto the skids E, these kick-offs being operated through the medium of a motor G, driving, through a reduction gear H and shaft I, the countershafts J, J' in turn actuating counterweighted levers K, K' which directly operate vertically movable plungers in the several kick-offs F, F'.

Disposed between the inner ends of the roll tables is the welding unit L provided with grip clamps M, M' and contact clamps N, N' of any suitable design and construction and carrying a push-up cylinder O through which the clamp M may be moved slightly toward the center of the unit so as to force the pipes together while the actual welding is in progress. In front of this unit is a platform P upon which the welder stands in position to observe the progress of the welding cycle and through the medium of my invention control the operation of the welding machine; skids A are therefore on his left and skids A' on his right hand. At the side of the unit is an air cylinder Q. The piston of this cylinder actuates a lever X, which is fulcrumed at X1. On the end of this lever is an adjustable stop S which, when projected downwardly, depends into the paths of the pipe sections when disposed on the roll tables and thus operates to determine the position of the first section with respect to the unit; after it has performed this function the stop is retracted so as to clear said path and permit the sections to come together.

Since the details of construction and arrangement of the various mechanisms embodied in the welding machine are matters of choice and form no part of the present invention, further specific reference thereto would be superfluous.

In accordance with my invention and for the purpose of controlling the various fluids utilized for actuating the different elements of the welding machine, I dispose at a convenient point adjacent the operator's platform P an air valve battery, generally designated as 1, a master switch 2 of suitable construction, and preferably, an oil pump 3 and 4-way oil reversing valve 4 controlling the direction of the flow of oil supplied from the pump. The air valve battery, best shown in Figs. 3 and 4, comprises a plurality of similar valve units 5, 5$^1$, 5$^2$, 5$^3$ and 5$^4$ corresponding in number to the individual air operated elements in the welding machine. In the specific embodiment shown, the battery thus contains five units respectively interconnected with the pipe stop cylinder Q; with the cylinder controlling the left hand contact clamp N; with the cylinder controlling the left hand pipe grip clamp M; with the cylinder controlling the right hand contact clamp N' and with the cylinder controlling the right hand pipe grip clamp M'.

As best shown in Fig. 4, each of these units comprises a casing 6 in which are arranged two pair of vertically slidable poppet valves 7 and 8, the former constituting inlet valves and the latter exhaust valves. The casing is so partitioned interiorly as to provide a common inlet chamber 9 in which the valves 7, 7 are disposed, separate intermediate chambers 10, 10 and separate exhaust chambers 11, 11. To the inlet chamber 9 is connected a branch pipe 12 running from the main air inlet manifold 13 which is supplied with compressed air from any suitable source; thus the passage of air from the inlet chamber 9 to the intermediate chambers 10, 10 is respectively controlled by the valves 7, 7. In like manner the passage of air from the intermediate chambers to the exhaust chambers 11 is respectively controlled by the exhaust valves 8, 8 and each exhaust chamber is provided with a port 14 leading directly into the atmosphere. The inlet valves are mounted on valve stems 16 extending downwardly from the valve casing and through packing glands 17 so as to prevent leakage from the intermediate chambers while the exhaust valves are mounted on valve stems 18 extending through guide holes leading from the chambers 11, no packing glands being provided at these points, however, since leakage is immaterial. The valve casings are respectively supported on U-shaped frames 20 bolted or otherwise secured together and bored for the passage of the enlarged lower ends of the valve stems which, below the frame, are provided with springs 22 and cam rolls 23 cooperative with cams 24 disposed on a horizontally extending cam shaft 25 and rotatable therewith. This cam shaft is suitably journaled in vertically extending uprights 27 supported on the platform P or the floor of the building and which also serve to support the U-shaped members 20 which carry the valve casings, all as best shown in Fig. 3.

As hitherto stated, the valve battery 1 is disposed on or adjacent the platform P and on the latter, preferably adjacent that edge thereof next to the welding unit, is erected a pedestal 30 preferably braced by a girder 31 to the rearmost upright 27. This pedestal at a convenient height above the platform is provided with a suitable bearing 32 in which is journaled a short horizontal shaft 33 carrying at its rear end a sprocket 34 from which a chain 35 extends to a corresponding sprocket 36 on the rear end of the cam shaft 25. On the forward end of the shaft 33 and rotatable therewith is mounted a dial 37 of relatively considerable diameter and carrying a handle or handles 38 by means of which it can be readily revolved so as to turn the cam shaft 25 through the medium of the chain and sprocket connection, and since the sprockets are of the same size, one revolution of the dial will cause a corresponding single revolution of the cam shaft. The edge of the dial is provided with a series of circumferentially spaced notches 37' and a spring pressed detent 39 cooperative therewith is disposed on a bracket carried by the pedestal in such manner that as the dial is rotated the detent will successively enter into the notches and thereby afford the operator a physical indication that the dial has moved from one notch to the next, as well as serving to temporarily hold the dial from accidental or unintentional rotation.

Each of the intermediate chambers 10 in each valve casing is provided with a port 40 and from these two ports pipes or tubes are respectively extended to the opposite ends of the cylinder which is to be controlled from that particular valve casing. Thus, in the case of unit 5 the pipes are extended to the opposite ends of the control cylinder Q of the pipe stop; in the case of unit 5$^1$ the pipes are extended to the control cylinder for the left hand contact clamp N, and so on, while the cams 24 on the cam shaft 25 are so designed and set as to open and close the inlet valves 7, 7 in each valve casing at the proper times to admit air from the inlet chamber 9 to one or the other of the intermediate chambers 10 and from thence, through one or the other of the pipes leading therefrom, to that end of the control cylinder proper to actuate its piston and in turn the mechanism connected therewith in the desired manner. While, as just indicated, it is usually convenient to connect the rearmost valve casing 6 to the cylinder of the pipe stop and to connect the other valve casings with the various other actuating cylinders of the other different mechanisms of the welding machine in the order in which the said mechanisms operate in the welding cycle, such an arrangement is purely arbitrary as, if preferred, any valve casing may be connected with any actuating cylinder and the cams operating its valves so designed and set as to operate such cylinder in proper time and sequence during the cycle.

The exhaust valves 8 in each valve casing are also respectively operated by individual cams 24' on the cam shaft in such manner that they will be opened to permit air to be discharged from either end of the actuating cylinder connected to such valve casing while air is being admitted to the opposite end thereof, the exhaust air passing from the actuating cylinder to one or the other of the exhaust chambers 11 in the valve casing and from thence through the port 14 leading therefrom to the atmosphere.

It will thus be apparent that when the dial 37 is rotated through a complete revolution, all of the inlet and exhaust valves are actuated in properly timed sequence to admit air to one end of each of the actuating cylinders and to exhaust it from the other end and vice versa to thereby sequentially operate the various mechanisms of the welding machine with which the said actuating cylinders are respectively connected and thus enable them to properly play their several parts in the welding cycle.

However, as has been previously mentioned, an ordinary butt welding machine embodies electrically controlled mechanisms as well as air controlled ones, while the particular machine which I have chosen to illustrate also includes an oil operated mechanism comprising, among other things, an electric motor driving the oil pump 3 and a 4-way reversing valve for controlling the direction of the flow of the oil to the push-up cylinder O operating on the left hand pipe grip N. In accordance with my invention I therefore provide means, also operable through the medium of the dial 37 and shaft 25, for effecting the actuation of these various elements in properly timed sequence with respect to the operation of the air controlled elements and with respect to each other so that a complete revolution of the dial will not only properly actuate the air controlled instrumentalities embodied in the welding machine but also the electrically and oil controlled ones as well.

To this end I provide the master switch 2, to which reference has been made, and which may be of any specific construction so long as it is adapted to be driven through rotation of a shaft 50 extending out of the switch casing and is so arranged that upon a single revolution of the shaft a series of contacts adapted to permit the passage of current to the various electrically controlled elements of the welding machine will be effected during a single cycle of the latter so as to properly operate the lifting mechanisms D, D', the rolls b, b' of the roll tables B, B' and the motor G of the kick-offs F, F' as well as to turn the welding current on and off and start and stop the oil pump motor R.

For operating the 4-way oil reversing valve which governs the flow of oil to and from the push-up cylinder O in properly timed relation and sequence with the other mechanisms, I preferably provide an additional pair of cams 55 upon the crank shaft between the air valve battery and the master switch or any other convenient location, cooperative with a cam roll 56 on a plunger 57 pivoted to a lever 58 in turn pivoted to the control plunger 59 of the 4-way reversing valve and which, when reciprocated, is effective to reverse the flow of oil passing through the valve, the cams being so designed and set that this reversal will be effected at the proper time in the welding cycle to actuate the pushup cylinder O to force the pipe sections together by moving the grip N or in any other suitable way and to thereafter retract the grip or other part to its normal position.

It will, of course, be appreciated that the notches in the periphery of the dial 37 are so located with respect to each other that as the dial is consecutively turned in a clockwise direction by the operator who stands in front of it, that is, as the dial is moved from "Start" position to the first notch, one or more of the welding machine mechanisms will be actuated to perform certain definite steps in the welding cycle; that as the dial is then moved from the first notch to the second notch other mechanisms will be actuated to perform other steps and so on until a complete revolution of the dial has been made, during which two pipe sections have been introduced into the machine, welded together, and discharged therefrom and the machine brought back to initial position and thus in condition to receive two more pipe sections.

Desirably, as shown in Fig. 5, the face of the dial is engraved with suitable legends in the segments between the different notches to indicate to the operator the particular mechanisms which are actuated as the dial is rotated from one notch to the next, so that, in operating the machine, the operator pauses at each notch long enough for the operations to take place at that particular point, and then proceeds to the next notch.

In Fig. 6 I have diagrammatically shown the various mechanisms of the machine to which I have referred together with the air valve battery, master switch, oil pump, and 4-way reversing valve, as well as the connections between these several parts. It is believed this figure will be of assistance in comprehending the general arrangement of the various circuits, air and fluid lines, which, however, is in no sense arbitrary.

It will now be readily apparent that while the pipes are being welded the operator stands on the platform P facing the dial 37 which, at the beginning of each welding cycle, is in "Start" position. Then, by rotating the dial in a clockwise direction, he causes the various mechanisms of the welding machine to consecutively function to perform the several steps incident to the cycle which, in brief, are as follows: The leading pipe section of the skids A is first raised over the stops a by the lifts D and thus moved to the roll table B. It is then moved longitudinally on the table toward the welding unit L until it encounters the pipe stop S which properly locates the pipe section with respect to the welding unit. The contact clamp N is then closed around the pipe, the grip or locking clamp M similarly closed about it, and the stop S moved out of the way. The leading pipe section on the skids A' is then delivered to the roll table B' in a similar way and moved up until it contacts the end of the first pipe section, after which the contact clamp N' and the locking clamp M' are closed about it and the welding current then turned on. As the ends of the pipe are heated by the current, the push-up cylinder O is actuated through the medium of the oil pump 3 and 4-way reversing valve 4 so as to push the pipe sections forcibly together, the driving motor R for the oil pump having previously been turned on. As soon as the welding operation is completed, the welding current is shut off, all of the clamps are disengaged from the pipe, and the latter ejected onto the skids E by the operation of the kickoffs F, F', after which the push-up cylinder O is actuated through a reversal of the 4-way reversing valve to move the grip M back to normal position. The welding cycle is now completed and the machine once more in condition to receive the next pair of pipe sections from the skids A, A'.

Thus, through the medium of my invention, the various mechanisms, irrespective of the precise mediums used to bring about their actuation, are necessarily caused to function in properly timed sequence by merely rotating the dial in the proper direction and at a speed as high as is commensurate with the ability of the machine to perform the various steps required during the welding cycle, while the operative's control of the welding machine as a whole and his ability to vary the times respectively required for the functioning of the different mechanisms is in no way diminished. Moreover, the fact that the operator through the use of the invention can concentrate substantially all of his attention upon the progress of the work through the machine instead of dividing it between such progress and the manipulation of a plurality of individual and separate controls tends to the production of a higher percentage of perfect welds and the turning out of an increased volume of work, while the relief from mental and physical strain permits him to satisfactorily operate the machine for a longer period without exhaustion. Additionally, as the only requirement for insuring operation of the controls in properly coordinated sequence is that of turning the dial in a predetermined direction, substantially all danger of injury to the machine and/or waste of time and material due to imperfect welds is avoided.

While I have herein referred with considerable particularity to a type of welding machine in common use and embodying a plurality of mechanisms severally controlled through the flow of various fluids, it is of course to be understood that the invention is readily applicable to welding machines of other construction and that, consequently, I do not desire or intend to in any way limit or confine the use of the invention to a machine of the specific character of that herein disclosed, nor to one embodying any previse number of different individually operative mechanisms, while the details of design, construction and arrangement of the variout parts which I employ are capable of variation in numerous particulars without departing from the spirit and scope of the invention as defined in the appended claims.

Having thus described my invention, I claim and desire to protect by Letters Patent Of the United States:

1. A control device for a butt welding machine embodying separate fluid actuated mechanisms, comprising a manually operable rotatable dial, a plurality of valve casings respectively interconnected with certain of said mechanisms, a source of air under pressure interconnected with each of said casings, a pair of poppet valves disposed in each of said casings each adapted to control the flow of air therethrough to one of said mechanisms, a pair of poppet valves in each of said casings each adapted to control the escape of air from one of said mechanisms, a cam shaft, a plurality of cams carried thereby and respectively cooperative with all of the valves to operate the latter in coordinated sequence, a master switch interconnected with a current source and to other of said mechanisms adapted to selectively control the flow of electricity thereto and comprising a rotatable shaft disposed in axial alignment with and coupled to said cam shaft, and flexible driving means so interconnecting said dial and said cam shaft that a single revolution of the dial is operative to actuate all of said valves and said master switch and thereby cause all of said mechanisms to perform their respective functions in the welding cycle in coordinated sequence.

2. In combination with a butt welding machine comprising individually operable fluid actuated mechanisms, an air valve battery including a plurality of separately actuated valves respectively adapted to control the flow of air to and from certain of said mechanisms, a cam shaft carrying a plurality of cams respectively adapted to actuate said valves, means for rotating said shaft whereby a continuous predetermined movement of said means is effective to actuate all of said valves in coordinated sequence to thereby cause said last mentioned mechanisms to perform their respective functions in the welding machine means for supplying a substantially non-compressible fluid to another of the fluid actuated mechanisms and means interconnected with said shaft for controlling the flow of said fluid to and from said mechanism in coordinated relation with the operation of said air valves to thereby correlate the operation of all of said mechanisms during a welding cycle.

3. The combination with a butt welding machine comprising individually operable fluid controlled mechanisms, of control means for said mechanisms comprising a plurality of sets of individually operable valves, the sets corresponding in number to the mechanisms to be controlled and the valves in each set being adapted to regulate the flow of fluid to and from one of said mechanisms means for supplying a substantially non-compressible fluid under pressure to at least one of said sets of valves, means for supplying a compressed gaseous fluid to others of said sets of valves, a cam shaft, a plurality of cams disposed thereon respectively cooperative with said valves to actuate the same upon rotation of the shaft, a rotatable dial, and a driving connection between the dial and the cam shaft such as to impart to the shaft a rotational movement corresponding to that of the dial whereby a single complete revolution of the dial is effective to actuate all of said valves in coordinated sequence and correspondingly operate all of said mechanisms through the medium of one or the other of said fluids during a single welding cycle.

4. A machine for electrically butt-welding pipe sections comprising means for bringing the pipe sections into longitudinally aligned position preparatory to welding, air controlled mechanism for actuating said means, means for forcing the ends of the respective pipe sections into abutting engagement, fluid controlled mechanism for actuating said last mentioned means, means operable to effect electrical contact with each of said pipe sections, air controlled means for actuating said last mentioned means, a switch operable to supply welding current to said contacting means, a pair of poppet valves interconnected with each of said air controlled mechanisms, a source of compressed air interconnected with one of the valves of each pair, an oil valve interconnected with said fluid controlled mechanism, a rotatable shaft disposed adjacent the welding machine a plurality of cams carried by said shaft in non-rotatable relation therewith, means interconnecting each of said cams with an adjacent valve, means interconnecting said shaft with said switch, manually operable actuating means remote from the shaft, and means interconnecting said manually operable means with said shaft and operative to effect rotation of said shaft in coordination therewith to thereby effect coordinated operation of said valves and said switch in the welding cycle.

ALLEN J. FRANTZ.